US010784692B2

(12) United States Patent
Zhang et al.

(10) Patent No.: US 10,784,692 B2
(45) Date of Patent: Sep. 22, 2020

(54) METHOD AND DEVICE FOR CHECKING CHARGING PARAMETER, AND CHARGER (71) Applicant: HUAWEI TECHNOLOGIES CO., LTD., Shenzhen (CN)

(72) Inventors: Fenwei Zhang, Beijing (CN); Yajun Pan, Shenzhen (CN); Chunjiang Zhao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 15/775,014

(22) PCT Filed: Nov. 4, 2016

(86) PCT No.: PCT/CN2016/104736
§ 371 (c)(1),
(2) Date: May 10, 2018

(87) PCT Pub. No.: WO2017/080411
PCT Pub. Date: May 18, 2017

(65) Prior Publication Data
US 2018/0375351 A1 Dec. 27, 2018

(30) Foreign Application Priority Data
Nov. 10, 2015 (CN) .......................... 2015 1 0765390

(51) Int. Cl.
*H02J 7/00* (2006.01)
*H02J 7/02* (2016.01)
(Continued)

(52) U.S. Cl.
CPC .............. *H02J 7/0029* (2013.01); *H02J 7/00* (2013.01); *H02J 7/027* (2013.01); *H04L 5/0055* (2013.01); *H04B 1/38* (2013.01)

(58) Field of Classification Search
CPC ...................................................... H02J 7/0029
(Continued)

(56) References Cited

U.S. PATENT DOCUMENTS 5,506,490 A * 4/1996 DeMuro ................ H02J 7/0011
320/106
5,747,189 A * 5/1998 Perkins .............. G01R 31/3004
429/61

(Continued)

FOREIGN PATENT DOCUMENTS

CN 1116462 A 2/1996
CN 103532211 A 1/2014
(Continued)

*Primary Examiner* — Yalkew Fantu
(74) *Attorney, Agent, or Firm* — Kilpatrick Townsend & Stockton LLP (57) ABSTRACT

The present disclosure relates to a method for checking a charging parameter. The method includes: after a communication channel between a terminal and a charger is successfully established, reading, by the terminal, charging capability information of the charger in a preset manner; comparing a maximum capability value of the charger for each preset charging parameter with a target value that is corresponding to a corresponding preset charging parameter and that is stored in the terminal, and determining a minimum value as a first configuration value for the corresponding preset charging parameter; writing, into the charger, the first configuration value that is obtained by means of comparison and that is for each preset charging parameter; reading a second configuration value of the charger for each preset charging parameter; and sending, by the terminal, a charging acknowledgment instruction to the charger after determining that all preset charging parameters are successfully configured.

9 Claims, 5 Drawing Sheets (51) Int. Cl.
*H04L 5/00* (2006.01)
*H04B 1/38* (2015.01)

(58) Field of Classification Search
USPC .......................................................... 320/107
See application file for complete search history.

(56) References Cited

U.S. PATENT DOCUMENTS 5,998,972 A * 12/1999 Gong .................... H02J 7/0077
320/134
2016/0064978 A1* 3/2016 Lei ........................ H02J 7/0004
320/114

FOREIGN PATENT DOCUMENTS

| CN | 104253456 A | 12/2014 |
| CN | 104393627 A | 3/2015 |
| CN | 104505552 A | 4/2015 |

* cited by examiner

METHOD AND DEVICE FOR CHECKING CHARGING PARAMETER, AND CHARGER

CROSS-REFERENCE TO RELATED APPLICATIONS

This application is a national stage of International Application No. PCT/CN2016/104736, filed on Nov. 4, 2016, which claims priority to Chinese Patent Application No. 201510765390.6, filed on Nov. 10, 2015. Both of the aforementioned applications are hereby incorporated by reference in their entireties.

TECHNICAL FIELD

Embodiments of the present invention relate to the field of charging technologies, and in particular, to a method and a device for checking a charging parameter, and a charger.

BACKGROUND

With rapid development of electronic products, an intelligent terminal system becomes more intelligent, a function of an intelligent terminal becomes more powerful, and accessories (such as a charger) of the intelligent terminal gradually develop toward intelligence.

Actually, there are higher requirements for a charger in future application, for example, a larger current, a shorter charging time, and safer charging protection. Therefore, a future development trend is that the charger gradually tends to be digitally controlled, and the charger and the intelligent terminal form an intelligent charging control system.

Currently, a battery of the intelligent terminal is mainly a lithium battery. However, a charging safety problem of the lithium battery is always an important technical problem. In particular, as a charging current and a capacity of the lithium battery of the intelligent terminal continuously increase, safety in a whole charging process becomes more important, and whether a charging parameter is accurately set directly determines whether a safety incident occurs in the charging process. Therefore, a cornerstone of charging safety is to ensure that the charging parameter is correctly set in the charging process.

In the prior art, a common charging system is a non-intelligent charging system. A relatively popular charging manner is high voltage charging. However, high voltage charging is basically performed in a simple unilateral control manner, that is, a system processor in a terminal controls, only by determining whether a level is high or low, a charger to enter a high voltage output state and perform a high voltage charging process. For example, a charging control system of a mobile phone configures a charger according to a simple answer standard, for example, high and low levels on some D+ and D– signal cables, and the charger completes charging voltage configuration according to configuration information provided by the mobile phone. In addition, in an existing high voltage charging solution, because of a simple answer mechanism of a charger, an incorrect state may be determined, and a high voltage output is incorrectly triggered, thereby resulting in a charging failure or fault finally.

Because a charging system of a current intelligent terminal is excessively simply designed, and cannot effectively control or determine a security threshold of each charging parameter in a charging process, a charging failure may be caused finally.

SUMMARY

Embodiments of the present invention provide a method and a device for checking a charging parameter, and a charger, to resolve a problem of a charging failure caused because a charging system of a current intelligent terminal is excessively simply designed, and cannot effectively control or determine a security threshold of each charging parameter in a charging process.

According to a first aspect, a method for checking a charging parameter includes:

after a communication channel between a terminal and a charger is successfully established, reading, by the terminal, charging capability information of the charger in a preset manner, where the charging capability information carries a maximum capability value of the charger for each preset charging parameter in a preset charging parameter set, the preset charging parameter set includes at least one preset charging parameter, and the maximum capability value for each preset charging parameter is set at delivery of the charger;

comparing, by the terminal, the maximum capability value of the charger for each preset charging parameter with a target value that is corresponding to a corresponding preset charging parameter and that is stored in the terminal, and determining a minimum value as a first configuration value for the corresponding preset charging parameter, where the terminal stores a target value corresponding to each preset charging parameter in the preset charging parameter set, and the target value corresponding to each preset charging parameter is determined according to basic battery information of the terminal;

writing, by the terminal into the charger, the first configuration value that is obtained by means of comparison and that is for each preset charging parameter in the preset charging parameter set;

reading, by the terminal, a second configuration value of the charger for each preset charging parameter in the preset charging parameter set, where the second configuration value for each preset charging parameter is obtained after the charger configures the corresponding preset charging parameter according to the first configuration value for each preset charging parameter;

when determining that the first configuration value for each preset charging parameter in the preset charging parameter set is the same as the second configuration value for the corresponding preset charging parameter, determining, by the terminal, that all preset charging parameters in the preset charging parameter set are successfully configured; and sending, by the terminal, a charging acknowledgment instruction to the charger.

With reference to the first aspect, in a first possible implementation of the first aspect, the charging capability message further carries a model of the charger; and after the reading, by the terminal, charging capability information of the charger, the method further includes:

determining, by the terminal, a first information group according to the model of the charger, where the first information group includes a maximum capability value that is corresponding to the model of the charger and that is for each preset charging parameter in the preset charging parameter set; and using, as a second information group, the maximum capability value that is carried in the charging capability information and that is of the charger for each preset charging parameter in the preset charging parameter set;

determining whether information included in the first information group is totally the same as information included in the second information group; and if the information included in the first information group is not totally the same as the information included in the second information group, correcting, by the terminal according to the first information group, information that is in the second information group and that is different from that in the first information group.

With reference to the first possible implementation of the first aspect, in a second possible implementation of the first aspect, the determining, by the terminal, a first information group according to the model of the charger includes:

searching, by the terminal in a model comparison table, for the first information group corresponding to the model of the charger, where the model comparison table records models of multiple chargers, and a first information group corresponding to a model of each charger.

With reference to any one of the first aspect or the foregoing possible implementations, in a third possible implementation of the first aspect, the method further includes:

when determining that a first configuration value and a second configuration value for a first preset charging parameter are different, writing, by the terminal, the first configuration value for the first charging parameter into the charger again; and reading a latest second configuration value for the first preset charging parameter, and if the first configuration value and the second configuration value for the first preset charging parameter are still different when a preset quantity of writing times is reached, determining, by the terminal, that writing of the first preset charging parameter fails.

According to a second aspect, a charger includes:

a register, configured to store charging capability information of the charger, where the charging capability information carries a maximum capability value of the charger for each preset charging parameter in a preset charging parameter set, the preset charging parameter set includes at least one preset charging parameter, and the maximum capability value for each preset charging parameter is set at delivery of the charger;

a processor, configured to: allow a terminal to read, in a preset manner, the charging capability information stored in the charger;

allow the terminal to write a first configuration value for each preset charging parameter in the preset charging parameter set;

configure a corresponding preset charging parameter according to the first configuration value for each preset charging parameter; and allow the terminal to read a second configuration value of the charger for each preset charging parameter in the preset charging parameter set; and a receiver, configured to receive a charging acknowledgment instruction sent by the terminal.

According to a third aspect, a device for checking a charging parameter includes:

a processor, configured to: after a communication channel to a charger is successfully established, read charging capability information of the charger in a preset manner, where the charging capability information carries a maximum capability value of the charger for each preset charging parameter in a preset charging parameter set, the preset charging parameter set includes at least one preset charging parameter, and the maximum capability value for each preset charging parameter is set at delivery of the charger;

compare the maximum capability value of the charger for each preset charging parameter with a target value that is corresponding to a corresponding preset charging parameter and that is stored in the device, and determine a minimum value as a first configuration value for the corresponding preset charging parameter, where the device stores a target value corresponding to each preset charging parameter in the preset charging parameter set, and the target value corresponding to each preset charging parameter is determined according to basic battery information of a terminal;

write, into the charger, the first configuration value that is obtained by means of comparison and that is for each preset charging parameter in the preset charging parameter set;

read a second configuration value of the charger for each preset charging parameter in the preset charging parameter set, where the second configuration value for each preset charging parameter is obtained after the charger configures the corresponding preset charging parameter according to the first configuration value for each preset charging parameter; and when it is determined that the first configuration value for each preset charging parameter in the preset charging parameter set is the same as the second configuration value for the corresponding preset charging parameter, determine that all preset charging parameters in the preset charging parameter set are successfully configured; and a transceiver, configured to send a charging acknowledgment instruction to the charger.

Beneficial effects of the present invention are as follows:

The embodiments of the present invention provide the device for checking a charging parameter. After the communication channel between the terminal and the charger is successfully established, the terminal reads the charging capability information of the charger in the preset manner, compares the maximum capability value of the charger for each preset charging parameter with the target value that is corresponding to the corresponding preset charging parameter and that is stored in the terminal, and determines the minimum value as the first configuration value for the corresponding preset charging parameter, so as to effectively ensure that the terminal is charged by using a most appropriate parameter. The terminal writes, into the charger, the first configuration value that is obtained by means of comparison and that is for each preset charging parameter in the preset charging parameter set, and reads the second configuration value of the charger for each preset charging parameter in the preset charging parameter set. When determining that the first configuration value for each preset charging parameter in the preset charging parameter set is the same as the second configuration value for the corresponding preset charging parameter, the terminal determines that all the preset charging parameters in the preset charging parameter set are successfully configured. Therefore, the terminal uses a redundancy check method to determine whether the first configuration value is successfully delivered, and whether the charger effectively responds to the first configured value. Finally, the terminal sends the charging acknowledgment instruction to the charger. Therefore, according to the method provided in the embodiments of the present invention, a redundancy check for a preset charging parameter can be completed, so as to prevent the charging parameter from being rewritten, or prevent a safety problem and a charging fault caused by a charging parameter mismatch in a charging process, and improve safety and reliability in the charging process.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The embodiments of the present invention provide a method and a device for checking a charging parameter, and a charger, to resolve a problem that a security threshold of each charging parameter in a charging process cannot be effectively controlled or determined because a charging system of a current intelligent terminal is excessively simply designed. The method and the apparatus are based on a same invention conception. Because a problem-resolving principle of the apparatus is similar to that of the method, mutual reference may be made to implementations of the method and the apparatus, and repeated description is not provided.

In the following, the preferred implementations of the present invention are described in detail with reference to the accompanying drawings.

Figure 1A:
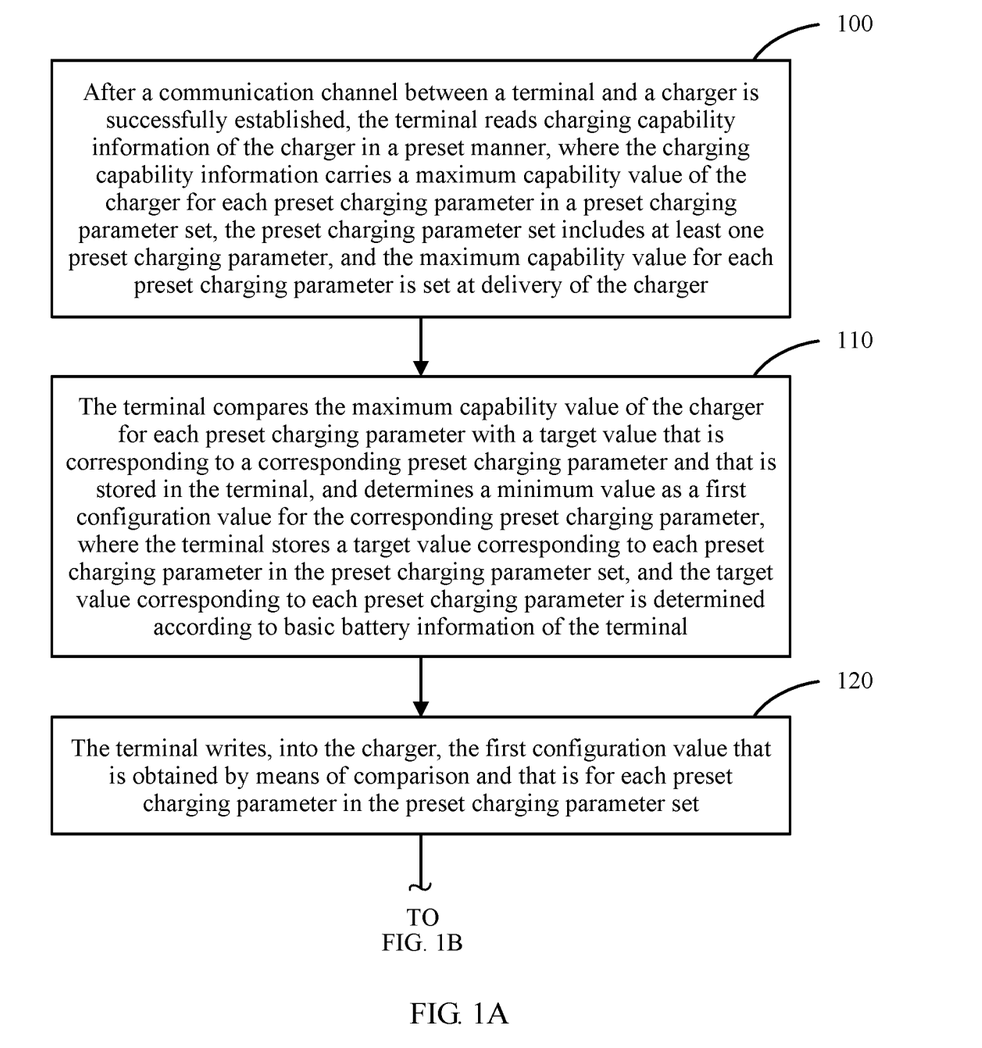
FIG. 1A and FIG. 1B are a flowchart of an overview of charging parameter checking according to an embodiment of the present invention.
Figure 1B:
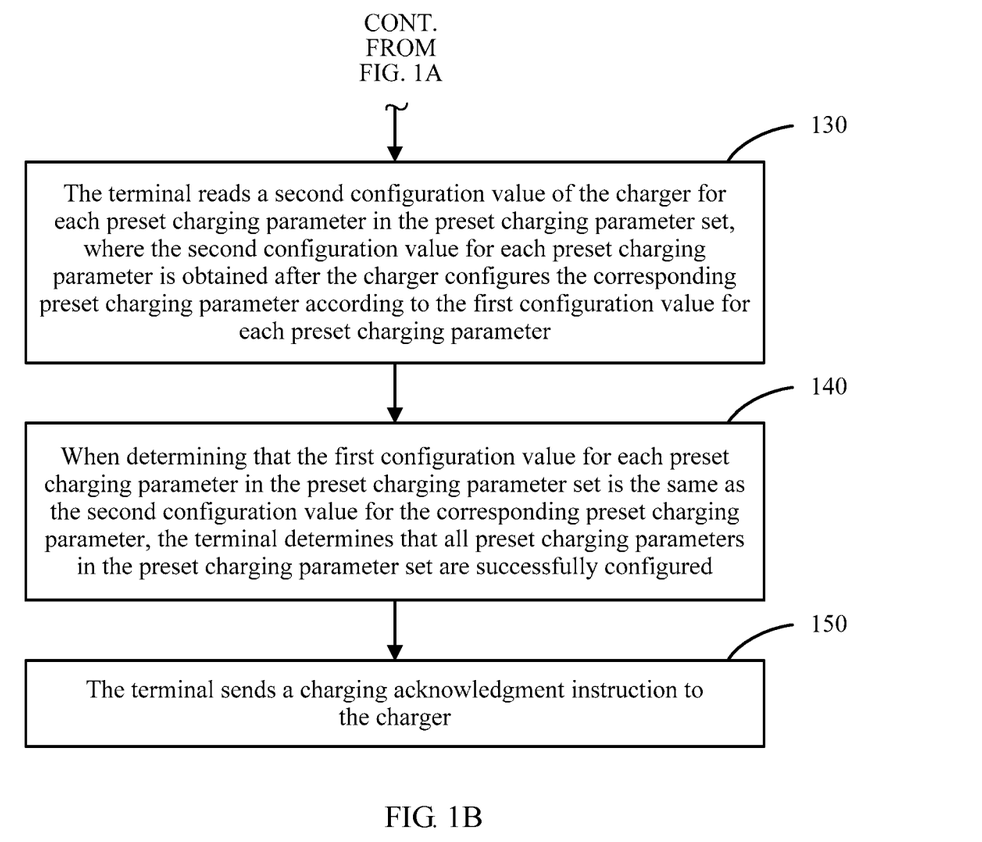

Referring to FIG. 1A and FIG. 1B, the present invention provides a method for checking a charging parameter, and the method includes the following steps.

Before a charging parameter check between a terminal and a charger starts, the terminal is connected to the charger by using a charging cable, or is connected to the charger in a wireless manner. A system processor in the terminal is responsible for completing a process of establishing a communication channel to the charger. This process is a standard communication channel establishment process in the prior art, and details are not described herein. After the system processor completes the establishment of the channel to the charger, different from the prior art, in this embodiment of the present invention, a charging control module in the terminal is responsible for a subsequent charging parameter checking process, and the specific process is as follows:

Step 100: After a communication channel between the terminal and the charger is successfully established, the terminal reads charging capability information of the charger in a preset manner, where the charging capability information carries a maximum capability value of the charger for each preset charging parameter in a preset charging parameter set, the preset charging parameter set includes at least one preset charging parameter, and the maximum capability value for each preset charging parameter is set at delivery of the charger.

Specifically, the terminal attempts to read charger capability information of the charger by using a preset protocol format and a preset command format. If the terminal successfully reads the charging capability information of the charger, it indicates that "handshake succeeds" between the terminal and the charger, and the charger is an intelligent charger. If the terminal fails to read the charging capability information of the charger, it indicates that the charger is a non-intelligent charger, "handshake fails" between the terminal and the charger, a subsequent charging parameter redundancy check cannot be performed, and the terminal can be charged only in an existing charging manner.

The preset charging parameter set may include charging parameters such as a voltage, a current, and power.

The maximum capability value for each preset charging parameter is set at delivery of the charger. For example, a maximum capability value for the current is 5 A, and it indicates that a maximum charging current that can be provided by the charger is 5 A.

In addition, the charging capability message further carries a model of the charger.

After reading the charging capability information of the charger, the terminal further needs to determine whether the maximum capability value of the charger for each preset charging parameter in the preset charging parameter set is modified.

The terminal first determines a first information group according to the model of the charger, where the first information group includes a maximum capability value that is corresponding to the model of the charger and that is for each preset charging parameter in the preset charging parameter set; and uses, as a second information group, the maximum capability value that is carried in the charging capability information and that is of the charger for each preset charging parameter in the preset charging parameter set.

Specifically, the terminal searches, in a model comparison table, for the first information group corresponding to the model of the charger. Where the model comparison table records models of multiple chargers, and a first information group corresponding to a model of each charger, and the model comparison table is stored in a local memory of the terminal.

Then, the terminal determines whether information included in the first information group is totally the same as information included in the second information group.

If the information included in the first information group is totally the same as the information included in the second information group, the terminal determines that the maximum capability value of the charger for each preset charging parameter in the preset charging parameter set is not modified.

If the information included in the first information group is not totally the same as the information included in the second information group, the terminal corrects, according to the first information group, information that is in the second information group and that is different from that in the first information group.

For example, the model of the charger that is carried in the charging capability information is ABC, and the terminal queries a first information group corresponding to the model ABC, and determines, for each preset charging parameter, whether a locally stored maximum capability value is the same as the maximum capability value carried in the charging capability information. For example, a current in the first information group corresponding to the charger with the model ABC is 1 A, and a current in a second information group carried in the charging capability information sent by the charger with the model ABC is also 1 A. In this case, it is determined that the current is not modified. If in this case, the current in the second information group carried in the charging capability information sent by the charger with the model ABC is 1.5 A, the current carried in the charging capability information is corrected into 1 A.

Step 110: The terminal compares the maximum capability value of the charger for each preset charging parameter with a target value that is corresponding to a corresponding preset charging parameter and that is stored in the terminal, and determines a minimum value as a first configuration value for the corresponding preset charging parameter, where the terminal stores a target value corresponding to each preset charging parameter in the preset charging parameter set, and the target value corresponding to each preset charging parameter is determined according to basic battery information of the terminal.

Basic battery information is set at delivery of each battery, and includes specified values of a series of parameters such as a current, a voltage, a resistance, and power. The terminal locally stores the basic battery information of a battery of the terminal. Each preset charging parameter is corresponding to one target value. By using the voltage as an example, if a voltage recorded in the basic battery information is 3 V, a target voltage value locally recorded by the terminal is 3 V.

Specifically, still by using the voltage as an example, the following procedure is executed for each preset charging parameter:

comparing maximum capability information 5 V of the voltage in the charging capability information with the target voltage value 3 V stored by the terminal, and using a minimum value 3 V as a first configuration value for the voltage, where the target voltage value is determined by the terminal according to the basic battery information.

For another example, if a preset charging parameter is the current, a target current value stored by the terminal is 5 A, and a maximum capability value for a current that can be provided by the charger is 4 A, a minimum value 4 A is used as a first configuration value of the current.

Step 120: The terminal writes, into the charger, the first configuration value that is obtained by means of comparison and that is for each preset charging parameter in the preset charging parameter.

The terminal writes the first configuration value for each preset charging parameter into the charger.

Different terminals may determine different first configuration values for a preset charging parameter. Therefore, for the preset charging parameter, a first configuration value written into the charger each time may be different, and content written this time covers content written last time.

Step 130: The terminal reads a second configuration value of the charger for each preset charging parameter in the preset charging parameter set, where the second configuration value for each preset charging parameter is obtained after the charger configures the corresponding preset charging parameter according to the first configuration value for each preset charging parameter.

The terminal reads a configuration result of the charger, to obtain the second configuration value for each preset charging parameter.

The charger executes the first configuration value that is written by the terminal and that is for each preset charging parameter, and configures the corresponding preset charging parameter by using the first configuration value for each preset charging parameter, to obtain the second configuration value for each preset charging parameter. That is, the second configuration value for each preset charging parameter is equal to the first configuration value corresponding to the preset charging parameter. When the charger is used to charge the terminal, an actual value that is of a preset charging parameter and that is provided by the charger is less than or equal to a second configuration value for the preset charging parameter. For example, by using the voltage as an example, a terminal A writes a first configuration value 3 V for the voltage into a charger a, and the charger a sets a second configuration value for the voltage to 3 V, that is, a maximum output voltage obtained when the charger a charges the terminal A is 3 V. Although a maximum capability value of the charger a for the voltage may be 5 V, the charger a performs configuration and output according to the first configuration value that is indicated by the terminal A and that is for the voltage, so that safety in a charging process is ensured.

Step 140: When determining that the first configuration value for each preset charging parameter in the preset charging parameter set is the same as the second configuration value for the corresponding preset charging parameter, the terminal determines that all preset charging parameters in the preset charging parameter set are successfully configured.

Specifically, by using the voltage as an example, the terminal compares a second configuration value 5 V for the voltage with a first configuration value 5 V for the voltage, and determines that the first configuration value and the second configuration value for the voltage are the same, so as to determine that the voltage is successfully configured.

The terminal executes the foregoing determining process for each preset charging parameter, to determine whether each preset charging parameter is successfully configured. When determining that the first configuration value for each preset charging parameter in the preset charging parameter set is the same as the second configuration value for the corresponding preset charging parameter, the terminal determines that all the preset charging parameters in the preset charging parameter set are successfully configured.

Step 150: The terminal sends a charging acknowledgment instruction to the charger.

In addition, if the terminal determines that a first configuration value and a second configuration value for a preset charging parameter X are different, the terminal writes the first configuration value for the preset charging parameter X into the charger again, and reads the second configuration value for the preset charging parameter X. If a second configuration value that is for the preset charging parameter X and that is obtained for the second time is the same as the first configuration value, the terminal determines that the preset charging parameter X is successfully configured. If a second configuration value that is for the preset charging parameter X and that is obtained for the second time is still different from the first configuration value, the terminal continues to write the first configuration value for the preset charging parameter X into the charger. If the first configuration value and the second configuration value for the preset charging parameter X are still different when a preset quantity of writing times is reached, the terminal determines that writing of the preset charging parameter X fails, and determines that a check of the preset charging parameter fails, and the terminal cannot use the charger for charging.

Specifically, after the terminal writes the first configuration value for the preset charging parameter X into the charger for the first time, if the read second configuration value for the preset charging parameter X is different from the first configuration value, a cable for connecting the terminal and the charger may encounter a problem, resulting in interference to writing by the terminal. Therefore, in this case, the terminal needs to write the first configuration value for the preset charging parameter X into the charger again and repeat the foregoing checking process.

The preset charging parameter X is one of the preset charging parameters included in the preset charging parameter set.

Figure 2:
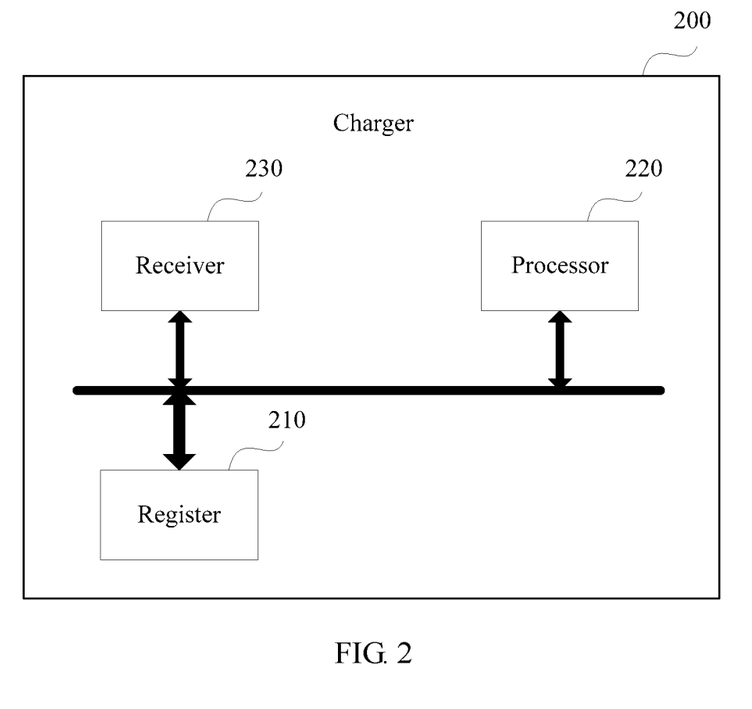
FIG. 2 is a schematic structural diagram of a charger according to an embodiment of the present invention.

Referring to FIG. 2, a charger 200 includes at least:

a register 210, configured to store charging capability information of the charger;

a processor 220, configured to: allow a terminal to read, in a preset manner, the charging capability information stored in the charger;

allow the terminal to write a first configuration value for each preset charging parameter in a preset charging parameter set;

configure a corresponding preset charging parameter according to the first configuration value for each preset charging parameter; and allow the terminal to read a second configuration value of the charger for each preset charging parameter in the preset charging parameter set; and a receiver 230, configured to receive a charging acknowledgment instruction sent by the terminal.

The charger provided in the present invention not only can provide the terminal with a maximum capability value of the charger for a preset charging parameter, but also can configure a corresponding preset charging parameter according to a first configuration value that is determined by the terminal and that is for the preset charging parameter, so as to complete a redundancy check for the preset charging parameter. Therefore, charging safety and reliability can be effectively ensured.

Figure 3:
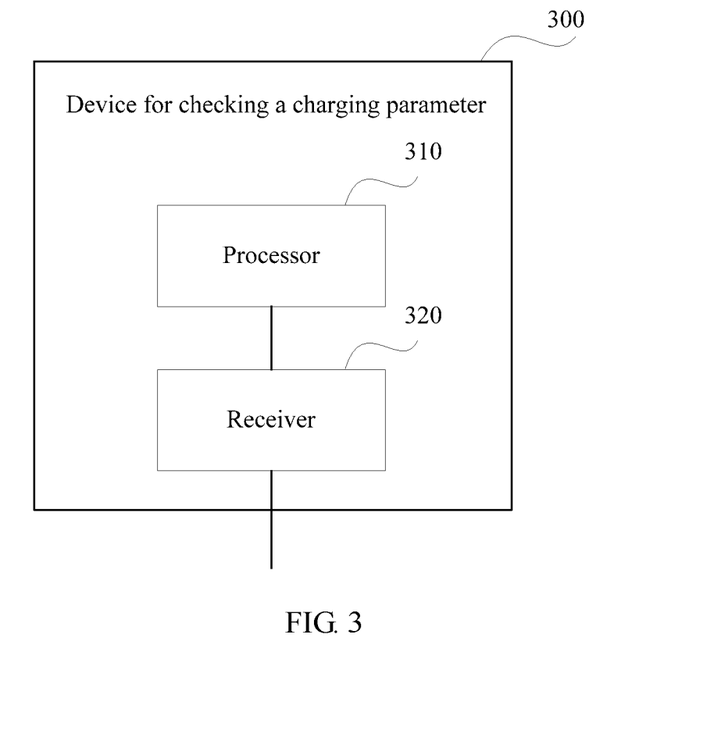
FIG. 3 is a schematic structural diagram of a device for checking a charging parameter according to an embodiment of the present invention.

Referring to FIG. 3, a device 300 for checking a charging parameter includes at least:

a processor 310, configured to: after a communication channel to a charger is successfully established, read charging capability information of the charger in a preset manner, where the charging capability information carries a maximum capability value of the charger for each preset charging parameter in a preset charging parameter set, the preset charging parameter set includes at least one preset charging parameter, and the maximum capability value for each preset charging parameter is set at delivery of the charger;

compare the maximum capability value of the charger for each preset charging parameter with a target value that is corresponding to a corresponding preset charging parameter and that is stored in the device, and determine a minimum value as a first configuration value for the corresponding preset charging parameter, where the device stores a target value corresponding to each preset charging parameter in the preset charging parameter set, and the target value corresponding to each preset charging parameter is determined according to basic battery information of a terminal;

write, into the charger, the first configuration value that is obtained by means of comparison and that is for each preset charging parameter in the preset charging parameter set;

read a second configuration value of the charger for each preset charging parameter in the preset charging parameter set, where the second configuration value for each preset charging parameter is obtained after the charger configures the corresponding preset charging parameter according to the first configuration value for each preset charging parameter; and when it is determined that the first configuration value for each preset charging parameter in the preset charging parameter set is the same as the second configuration value for the corresponding preset charging parameter, determine that all preset charging parameters in the preset charging parameter set are successfully configured; and a transceiver 320, configured to send a charging acknowledgment instruction to the charger.

Figure 4:
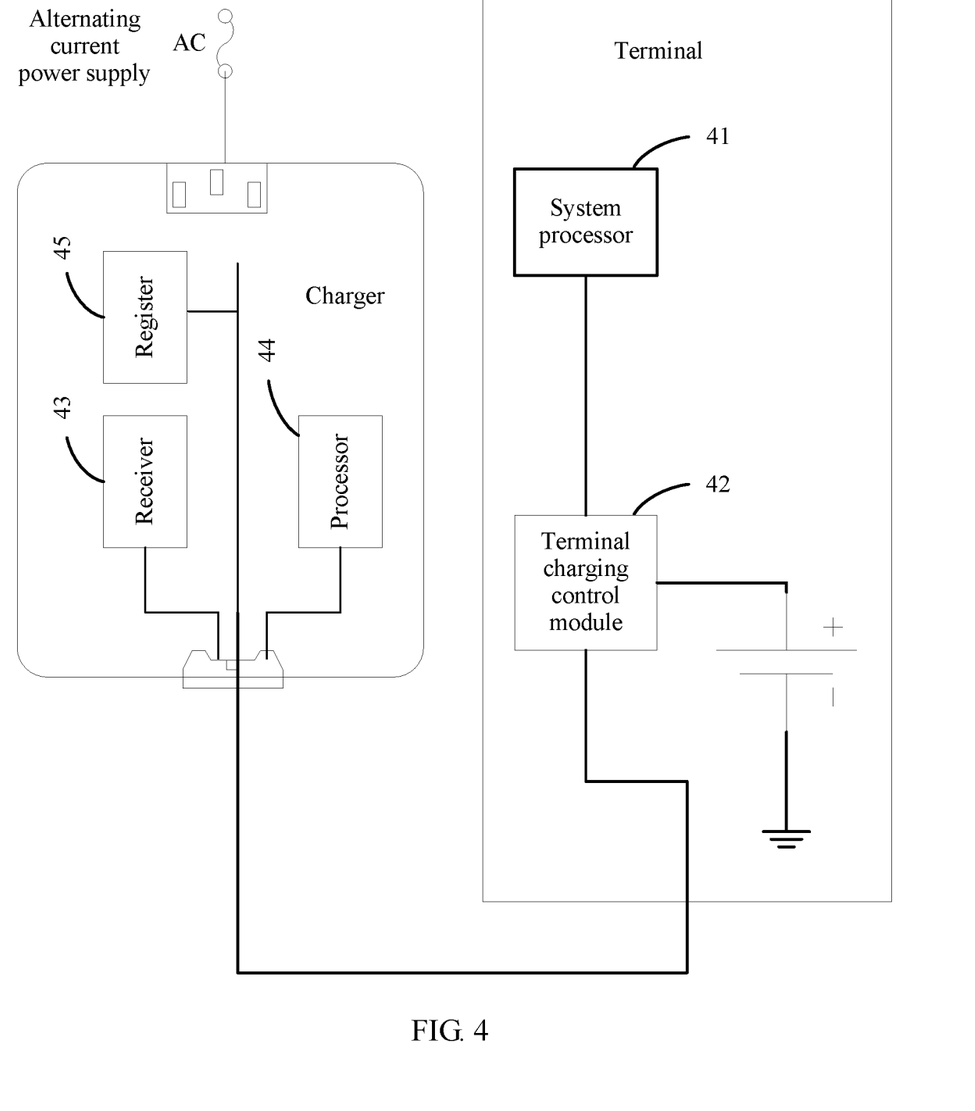
FIG. 4 is a schematic structural diagram of a connection between a charger and a terminal according to an embodiment of the present invention.

The device for checking a charging parameter may be used as an independent device or module, or may be disposed in the terminal as a terminal charging control module. Referring to FIG. 4, FIG. 4 is a schematic structural diagram of a connection between a charger and a terminal.

A system processor 41 is configured to establish a communication channel to the charger after the terminal is connected to the charger. A terminal charging control module 42 is a charging parameter checking module, and executes a charging parameter checking process described in this embodiment of the present invention.

The charger includes a receiver 43, a processor 44, and a register 45. The receiver 43, the processor 44, and the register 45 coordinate with a terminal side to complete the charging parameter checking process.

The device for checking a charging parameter provided in this embodiment of the present invention can complete a redundancy check for a preset charging parameter, so as to prevent the charging parameter from being rewritten, or prevent a safety problem and a charging fault caused by a charging parameter mismatch in a charging process, and improve safety and reliability in the charging process.

In conclusion, the embodiments of the present invention provide the method for checking a charging parameter. After the communication channel between the terminal and the charger is successfully established, the terminal reads the charging capability information of the charger in the preset manner, compares the maximum capability value of the charger for each preset charging parameter with the target value that is corresponding to the corresponding preset charging parameter and that is stored in the terminal, and determines the minimum value as the first configuration value for the corresponding preset charging parameter, so as to effectively ensure that the terminal is charged by using a most appropriate parameter. The terminal writes, into the charger, the first configuration value that is obtained by means of comparison and that is for each preset charging parameter in the preset charging parameter set, and reads the second configuration value of the charger for each preset charging parameter in the preset charging parameter set. When determining that the first configuration value for each preset charging parameter in the preset charging parameter set is the same as the second configuration value for the corresponding preset charging parameter, the terminal determines that all the preset charging parameters in the preset charging parameter set are successfully configured. Therefore, the terminal uses a redundancy check method to determine whether the first configuration value is successfully delivered, and whether the charger effectively responds to the first configured value. Finally, the terminal sends the charging acknowledgment instruction to the charger. Therefore, according to the method provided in the embodiments of the present invention, a redundancy check for a preset charging parameter can be completed, to prevent the charging parameter from being rewritten, or prevent a safety problem and a charging fault caused by a charging parameter mismatch in a charging process, and improve safety and reliability in the charging process.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program indications may be used to implement each process and/or each block in the flowcharts and/or the block diagrams and a combination of a process and/or a block in the flowcharts and/or the block diagrams. These computer program indications may be provided for a general-purpose computer, a dedicated computer, an embedded processor, or a processor of any other programmable data processing device to generate a machine, so that the indications executed by a computer or a processor of any other programmable data processing device generate an apparatus for implementing a specific function in one or more processes in the flowcharts and/or in one or more blocks in the block diagrams.

These computer program indications may be stored in a computer readable memory that can instruct the computer or any other programmable data processing device to work in a specific manner, so that the indications stored in the computer readable memory generate an artifact that includes an indication apparatus. The indication apparatus implements a specific function in one or more processes in the flowcharts and/or in one or more blocks in the block diagrams.

These computer program indications may be loaded onto a computer or another programmable data processing device, so that a series of operations and steps are performed on the computer or the another programmable device, thereby generating computer-implemented processing. Therefore, the indications executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for checking a charging parameter, comprising:
   after a communication channel between a terminal and a charger is successfully established, reading, by the terminal, charging capability information of the charger in a preset manner, wherein the charging capability information comprises:
   information indicating a model of the charger; and
   a maximum capability value of the charger for each preset charging parameter in a preset charging parameter set, wherein the preset charging parameter set comprises:
   at least one preset charging parameter comprising one of voltage, current, and power, and
   the maximum capability value for the at least one preset charging parameter set at delivery of the charger;
   determining, by the terminal, a target value corresponding to each preset charging parameter in the preset charging parameter set based on the model of the charger;
   comparing, by the terminal, the maximum capability value of the charger for each preset charging parameter with the target value corresponding to a corresponding preset charging parameter, wherein the corresponding preset charging parameter is stored in the terminal;
   determining, by the terminal, whether the maximum capability value of the charger or the target value corresponding to each preset charging parameter is a smaller value;
   based on determining the smaller value, assigning, by the terminal, the smaller value as a first configuration value for the corresponding preset charging parameter;
   storing locally, by the terminal, the target value corresponding to each preset charging parameter in the preset charging parameter set;
   writing into the charger, by the terminal, the first configuration value;
   after the charger configures the corresponding preset charging parameter according to the first configuration value for each preset charging parameter, obtaining, by the terminal, a second configuration value of the charger for each preset charging parameter in the preset charging parameter set;
   determining, by the terminal, that all charging parameters in the preset charging parameter set are successfully configured by determining that the first configuration value for each preset charging parameter in the preset charging parameter set is the same as the second configuration value for the corresponding preset charging parameter; and
   sending, by the terminal, a charging acknowledgment instruction to the charger.

2. The method according to claim 1, wherein after the reading, by the terminal, charging capability information of the charger, the method further comprises:
   determining, by the terminal, a first information group according to the model of the charger, wherein the first information group comprises a maximum capability value that is corresponding to the model of the charger and that is for each preset charging parameter in the preset charging parameter set; and using, as a second information group, the maximum capability value that is carried in the charging capability information and that is of the charger for each preset charging parameter in the preset charging parameter set;
   determining whether information comprised in the first information group is totally the same as information comprised in the second information group; and
   if the information comprised in the first information group is not totally the same as the information comprised in the second information group, correcting, by the terminal according to the first information group, information that is in the second information group and that is different from that in the first information group.

3. The method according to claim 2, wherein the determining, by the terminal, a first information group according to the model of the charger comprises:
    searching, by the terminal in a model comparison table, for the first information group corresponding to the model of the charger, wherein the model comparison table records models of multiple chargers, and a first information group corresponding to a model of each charger.

4. The method according to claim 1, wherein the method further comprises:
    when determining that the first configuration value and the second configuration value for a first preset charging parameter are different, writing, by the terminal, the first configuration value for the first preset charging parameter into the charger again; and
    reading a latest second configuration value for the first preset charging parameter, and if the first configuration value and the latest second configuration value for the first preset charging parameter are still different when a preset quantity of writing times is reached, determining, by the terminal, that writing of the first preset charging parameter fails.

5. A charger, comprising:
    a register, configured to store charging capability information of the charger, wherein the charging capability information comprises:
        a model of the charger; and
        a maximum capability value of the charger for each preset charging parameter in a preset charging parameter set, wherein the preset charging parameter set comprises:
            at least one preset charging parameter comprising one of voltage, current, and power, and
            the maximum capability value for the at least one preset charging parameter set at delivery of the charger;
    a processor, configured to:
        allow a terminal to read, in a preset manner, the charging capability information stored in the charger;
        allow the terminal to write a first configuration value for each preset charging parameter in the preset charging parameter set;
        configure a corresponding preset charging parameter according to the first configuration value for each preset charging parameter; and
        allow the terminal to read a second configuration value of the charger for each preset charging parameter in the preset charging parameter set; and
    a receiver, configured to receive a charging acknowledgment instruction sent by the terminal.

6. A device for checking a charging parameter, comprising:
    a processor, configured to:
        after a communication channel to a charger is successfully established, read charging capability information of the charger in a preset manner, wherein the charging capability information comprises:
            a model of the charger; and
            a maximum capability value of the charger for each preset charging parameter in a preset charging parameter set, wherein the preset charging parameter set comprises:
                at least one preset charging parameter comprising one of voltage, current, and power, and
                the maximum capability value for the at least one preset charging parameter set at delivery of the charger;
        compare the maximum capability value of the charger for each preset charging parameter with a target value corresponding to a corresponding preset charging parameter, wherein the corresponding preset charging parameter is stored in the device;
        determine whether the maximum capability value of the charger or the target value corresponding to each preset charging parameter is a smaller value;
        based on determining the smaller value, assigning the smaller value as a first configuration value for the corresponding preset charging parameter;
        store locally, the target value corresponding to each preset charging parameter in the preset charging parameter set;
        write, into the charger, the first configuration value;
        after the charger is configures the corresponding preset charging parameter according to the first configuration value for each preset charging parameter, obtain a second configuration value of the charger for each preset charging parameter in the preset charging parameter set;
        determine that all charging parameters in the preset charging parameter set are successfully configured when the first configuration value for each preset charging parameter in the preset charging parameter set is the same as the second configuration value for the corresponding preset charging parameter; and
    a transceiver, configured to send a charging acknowledgment instruction to the charger.

7. The device according to claim 6, wherein after reading charging capability information of the charger the processor is further configured to:
    determine a first information group according to the model of the charger, wherein the first information group comprises a maximum capability value that is corresponding to the model of the charger and that is for each preset charging parameter in the preset charging parameter set;
    and use, as a second information group, the maximum capability value that is carried in the charging capability information and that is of the charger for each preset charging parameter in the preset charging parameter set;
    determine whether information comprised in the first information group is totally the same as information comprised in the second information group; and
    if the information comprised in the first information group is not totally the same as the information comprised in the second information group, correct information that is in the second information group and that is different from that in the first information group according to the first information group.

8. The device according to claim 7, wherein the processor further configured to:
    search for the first information group corresponding to the model of the charger in a model comparison table, wherein the model comparison table records models of multiple chargers, and a first information group corresponding to a model of each charger.

9. The device according to claim 6, wherein the processor further configured to:
    write the first configuration value for the preset charging parameter into the charger again when determining that the first configuration value and the second configuration value for a first preset charging parameter are different; and read a latest second configuration value for the first preset charging parameter, and if the first configuration value and the latest second configuration value for the first preset charging parameter are still different when a preset quantity of writing times is reached, determine that writing of the first preset charging parameter fails.

* * * * *